W. B. C. PORTER.
THERMOSTATIC SWITCH OR CUT-OFF.
APPLICATION FILED MAR. 30, 1915.

1,198,376.

Patented Sept. 12, 1916.
2 SHEETS—SHEET 1.

Witnesses
E. R. Ruppert
C. C. Hines

Inventor
Will B. C. Porter
By Victor J. Evans
Attorney

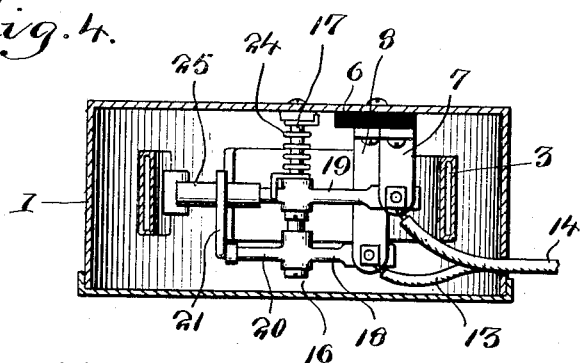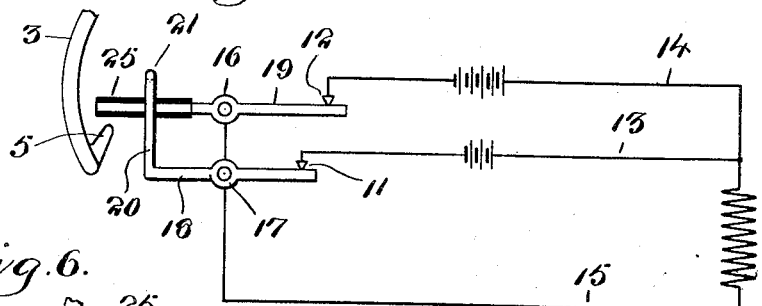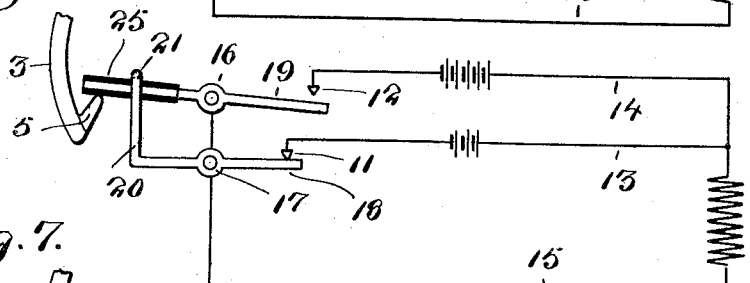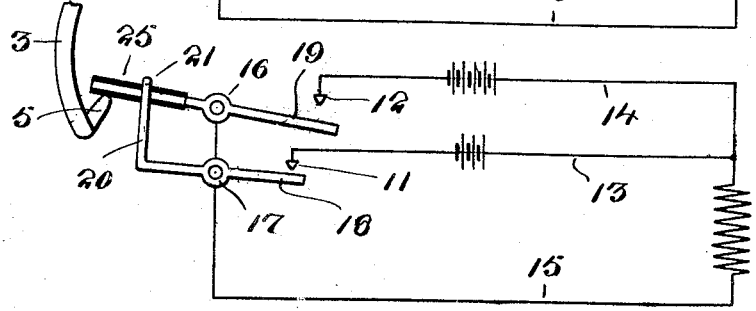

UNITED STATES PATENT OFFICE.

WILL B. C. PORTER, OF KENNETT, MISSOURI, ASSIGNOR OF ONE-HALF TO THEODORE ROBB, OF KENNETT, MISSOURI.

THERMOSTATIC SWITCH OR CUT-OFF.

1,198,376.  Specification of Letters Patent.  Patented Sept. 12, 1916.

Application filed March 30, 1915.  Serial No. 18,202.

*To all whom it may concern:*

Be it known that I, WILL B. C. PORTER, citizen of the United States, residing at Kennett, in the county of Dunklin and State of Missouri, have invented new and useful Improvements in Thermostatic Switches or Cut-Offs, of which the following is a specification.

This invention relates to a thermostatic switch or cut-off for regulating and governing the supply of electricity to an electrically heated apparatus or implement such as a dental vulcanizer, so as to permit determined temperature to be gained and then automatically maintained for any definite period.

The object of the invention is to provide a device of the character for the purpose described which is simple of construction, reliable and efficient in operation, and adapted for general use where steam or hot air from the apparatus heated may be utilized to control a thermostat.

A further object of the invention is to provide a controller by means of which a maximum amount of current may first be supplied to heat the apparatus, a diminished amount of current then supplied to maintain the apparatus at the predetermined temperature, and the entire current supply cut off when such temperature is exceeded and until the temperature is reduced, when the flow of current will then be automatically restored.

The invention consists of the features of construction, combination and arrangement of parts herein fully described and claimed, reference being had to the accompanying drawings in which:—

Figure 1:
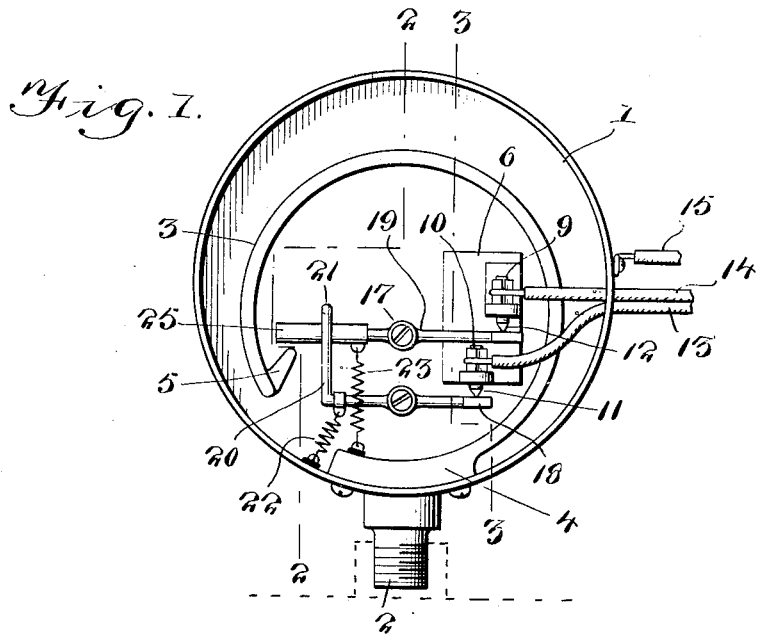
Figure 2:
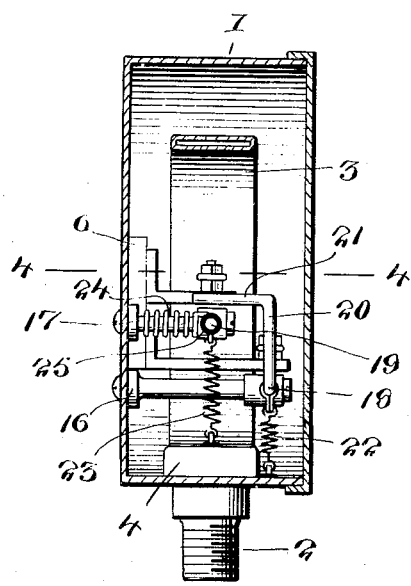
Figure 3:
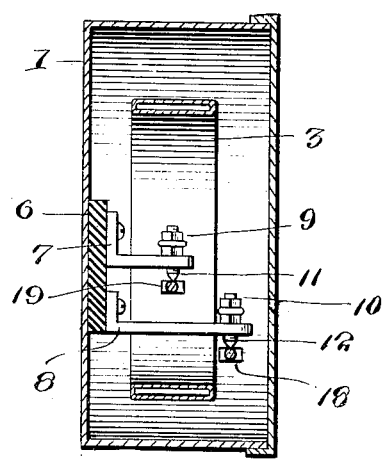

Figure 1 is a view in elevation of the device, showing the cover of the inclosing casing removed. Figs. 2 and 3 are vertical sections on the lines 2—2 and 3—3 of Fig. 1. Fig. 4 is a horizontal transverse section on the line 4—4 of Fig. 2. Figs. 5, 6 and 7 are diagrammatic views of the device and operating portions of an electric circuit, illustrating the different controlling sections.

In carrying my invention into practice, I provide a suitable frame or casing 1, shown in the present instance in the form of a casing of suitable size to receive and inclose the working elements of the controller. This casing is provided with a hollow threaded stem 2 for insertion into an aperture of the apparatus to be heated, or into the threaded aperture of a chamber into which steam or hot air from the apparatus flows. Disposed within the casing 1 is a thermostatic device 3, consisting of a hollow metallic coil, such as a copper coil, which has one of its ends connected with a hollow bracket 4 carrying the stem 2 and in communication therewith, the other end of the coil being free to permit expansion and contraction of said coil and being provided with a projection 5. The coil 3 is adapted to be supplied with hot air or steam from the apparatus heated, and expands and contracts to definite degrees according to the temperature of the heated fluid supplied thereto, but any other suitable type of thermostat having a movable portion or member may be employed. Secured to the back of the casing 1 is a board or plate 6 of slate or other insulating material, to which are fastened brackets 7 and 8 carrying binding posts or screws 9 and 10 terminating in contact points 11 and 12. Connected with these binding posts are primary and secondary current feed wires 13 and 14, which, with the brackets and screws are insulated from the casing, and connected with the casing itself is a ground or return wire 15.

The wires 13 and 14 may be connected with separate sources of current supply, such as with separate storage batteries which may be of unequal voltage, so that through both wires the maximum amount of current designed to be used may be supplied to the apparatus to be heated, while through one of the wires, namely the wire 13, a diminished amount of current may be supplied to maintain a determined temperature after such temperature has been initially reached.

Supported by and electrically connected with the casing are pivot posts 16 and 17, and pivotally mounted on said posts, and electrically connected with the casing therethrough, are switch members 18 and 19. These switch members are pivoted one below the other at a point intermediate of their lengths, so as to provide contact arms at one side of their pivots for coöperation with the contact points 11 and 12 and oprating arms at the opposite sides of their pivots whereby they are governed and controlled.

The operating arm of the switch member 18 carries an upwardly extending finger 20 which has a lateral extremity 21 overlying the operating arm of the switch member 19 and normally arranged in spaced relation thereto, the said operating arm of the lever 18 being arranged to lie out of the path of movement of the projection 5 of the thermostatic coil 3, while the operating arm of the lever 19 is disposed in the path of movement of said projection 5 and is adapted to be engaged and actuated thereby.

When the parts are in normal position for the supply of current to the apparatus, and the internal temperature of such apparatus is below the maximum, the switches lie horizontally and in parallel relation to each other and in engagement with the contacts, in which position they are held by coiled contractile springs 22 and 23 connecting the operating arms of the switches with the bracket, the switch 19 being also controlled by a coiled spring 24 encircling its pivot to regulate the resistance of said switch against retraction through the action of the thermostat. The operating arm of the lever 19 is provided with an insulating sheathing 25 of rubber or suitable material for engagement with the projection 5 so as to prevent short-circuit when the aforesaid parts are in contact.

It may be assumed, for purposes of example, that the controller is applied to or in communication with a heating apparatus in which steam is generated or air is heated to a degree corresponding to the internal temperature of such apparatus, and that this heated fluid flows through the stem 2 into the thermostatic coil 3, which expands to a greater or less degree dependent upon such temperature. With this understanding, although, for the purposes of the invention any other suitable style of thermostat may be used, it will be understood that at the outset the switches will be maintained in engagement with their contacts by their controlling springs, so that a full supply of current to the apparatus through both feed wires 13 and 14 will be furnished. As the temperature in the apparatus increases the coil 3 will begin to expand and as the temperature approaches the maximum point the projection 5 of the coil will be in close proximity to the operating arm of the switch 19. When the maximum temperature is reached and the coil expands to a further degree, the projection 5 will engage and lift the operating arm of the switch 19 until it comes in close proximity to the lateral extremity 21 of the finger 20, whereby the lever 19 will be thrown out of engagement with the contact 12, thus cutting off the supply of current through the conductor 14, without influencing the switch 18 which still remains in engagement with the contact 11, so that current will still be supplied to the feed wire 13 to maintain the temperature attained. If the maximum temperature should be exceeded the further movement of the projection 5 under the continued expansion of the coil 3 will result in a further elevation of the operating arm of the lever 19 which will thereupon engage the extremity 21 of the finger 20 and transfer motion to the switch 18 to throw the latter out of engagement with the contact 11, thereby cutting off the supply of current to the apparatus. When the temperature in the apparatus again falls to the maximum the switch 18 will be closed to supply a partial current, but the switch 19 will remain open unless the temperature falls to a predetermined degree, when it will be allowed to close by the contraction of the thermostatic coil to supply with the switch 18 the full amount of current to the apparatus.

It will be evident from the foregoing description that my invention provides a thermostatic electric switch which will control the supply of current to a device or apparatus to be heated in a thorough, reliable and efficient manner, and will regulate the supply of current according to the temperature, so that at a low temperature a full volume of current will be supplied, while at a higher temperature a smaller volume of current will be supplied, thus enabling the maximum temperature to be quickly obtained and the current to be diminished at such stage so that the maximum temperature may be maintained under all normal conditions. While a preferred type of thermostat is shown, it will of course be understood that this type is not essential, and while the controller is designed particularly for use in conjunction with electrical dental apparatus, it will be understood that it may be employed as a general controller for governing the flow of electricity from one or more sources of supply to any type of apparatus to be electrically heated.

I claim:—

1. A controller including a pressure controlled element, a switch directly operated by said element for controlling a source of electric current inactive, means for opposing determined resistance to the movement of said switch, a second switch operated upon a predetermined movement of the first-named switch for controlling a second source of electric current, and a means for normally maintaining said switches in position for maintaining the circuits in active condition.

2. A controller comprising a pressure controlled element, a pivotally mounted switch actuated by said element upon a predetermined movement of the latter for controlling one source of electric current, a spring for opposing a predetermined resistance to the movement of said switch, a second pivotally mounted switch arranged to be actuated by the first-named switch upon a predetermined movement of the latter for controlling a second source of electric current, and springs acting upon said switches for normally holding the same in position to maintain the circuits in active condition.

In testimony whereof I affix my signature in presence of two witnesses.

WILL B. C. PORTER.

Witnesses:
S. R. JONES,
W. C. HUPPMAN.

Copies of this patent may be obtained for five cents each, by addressing the "Commissioner of Patents, Washington, D. C."